United States Patent [19]

Andre

[11] Patent Number: 4,730,974
[45] Date of Patent: Mar. 15, 1988

[54] TILT TRAILER IN PARTICULAR FOR A ROAD TRANSPORT VEHICLE CARRIER

[75] Inventor: Jean-Luc Andre, Dangolsheim, France

[73] Assignee: Lohr S.A., Hangenbieten, France

[21] Appl. No.: 783,203

[22] Filed: Oct. 2, 1985

[30] Foreign Application Priority Data

Nov. 6, 1984 [FR] France ................................ 84 16972

[51] Int. Cl.⁴ ............................................. B60P 1/00
[52] U.S. Cl. .................... 414/483; 414/346; 414/537; 414/480; 280/479 R; 280/463; 14/72.5
[58] Field of Search ............... 414/480, 482, 483, 537, 414/340, 343, 345, 346, 350, 339; 298/22 B, 22 R, 22 J, 22 D; 280/462, 463, 479 R, 489; 14/71.1, 71.3, 71.7, 72.5

[56] References Cited

U.S. PATENT DOCUMENTS

| | | | |
|---|---|---|---|
| 1,906,302 | 5/1933 | Anthony | 298/22 B |
| 2,210,143 | 8/1940 | Day | 298/22 B |
| 2,646,178 | 7/1953 | Alvare | 414/339 |
| 2,650,859 | 9/1953 | Einstein | 298/22 B |
| 2,667,381 | 1/1954 | Tripodi | 298/22 B |
| 2,985,325 | 5/1961 | Domagalski | 414/339 |
| 3,033,129 | 5/1962 | DeGrandpre | 414/339 X |
| 3,228,546 | 1/1966 | Bunch | 414/483 |
| 3,272,357 | 9/1966 | Freni | 414/339 |
| 4,019,643 | 4/1977 | Kampman et al. | 280/463 X |
| 4,019,644 | 4/1977 | Seymour | 280/463 X |

FOREIGN PATENT DOCUMENTS

| | | | |
|---|---|---|---|
| 1137533 | 5/1957 | France | 414/480 |
| 1164823 | 10/1958 | France | 280/479 R |
| 1414976 | 9/1965 | France | 298/22 D |
| 131157 | 8/1919 | United Kingdom | 414/345 |

*Primary Examiner*—Frank E. Werner
*Attorney, Agent, or Firm*—Erwin S. Teltscher

[57] ABSTRACT

In a trailer adapted to be connected with a front end thereof to a rear-end of a carrier vehicle, and where the front end of the trailer is held at a predetermined height above ground when connected to the carrier-vehicle, the trailer includes a frame defining a trailer frame plane extending in a hauling position of the trailer substantially parallel to the ground, a front extension and a rear extension of the trailer extending substantially along the trailer frame plane, the front extension being connected between the front end and the trailer frame, the trailer front end including an elongated drawbar defining a drawbar plane subtending a first angle close to 180° with the trailer frame plane in the hauling position, the improvement includes an angle varying device for changing the first angle to a second angle when the trailer frame is in a position for providing access to vehicles to be loaded onto the trailer for subsequent passage to the carrier vehicle, the predetermined height being similar in the hauling and vehicle access positions of said trailer frame, whereby the rear extension touches the ground when the drawbar plane subtends the second angle with the trailer frame plane, so as to provide a gently sloping vehicle access ramp.

1 Claim, 5 Drawing Figures

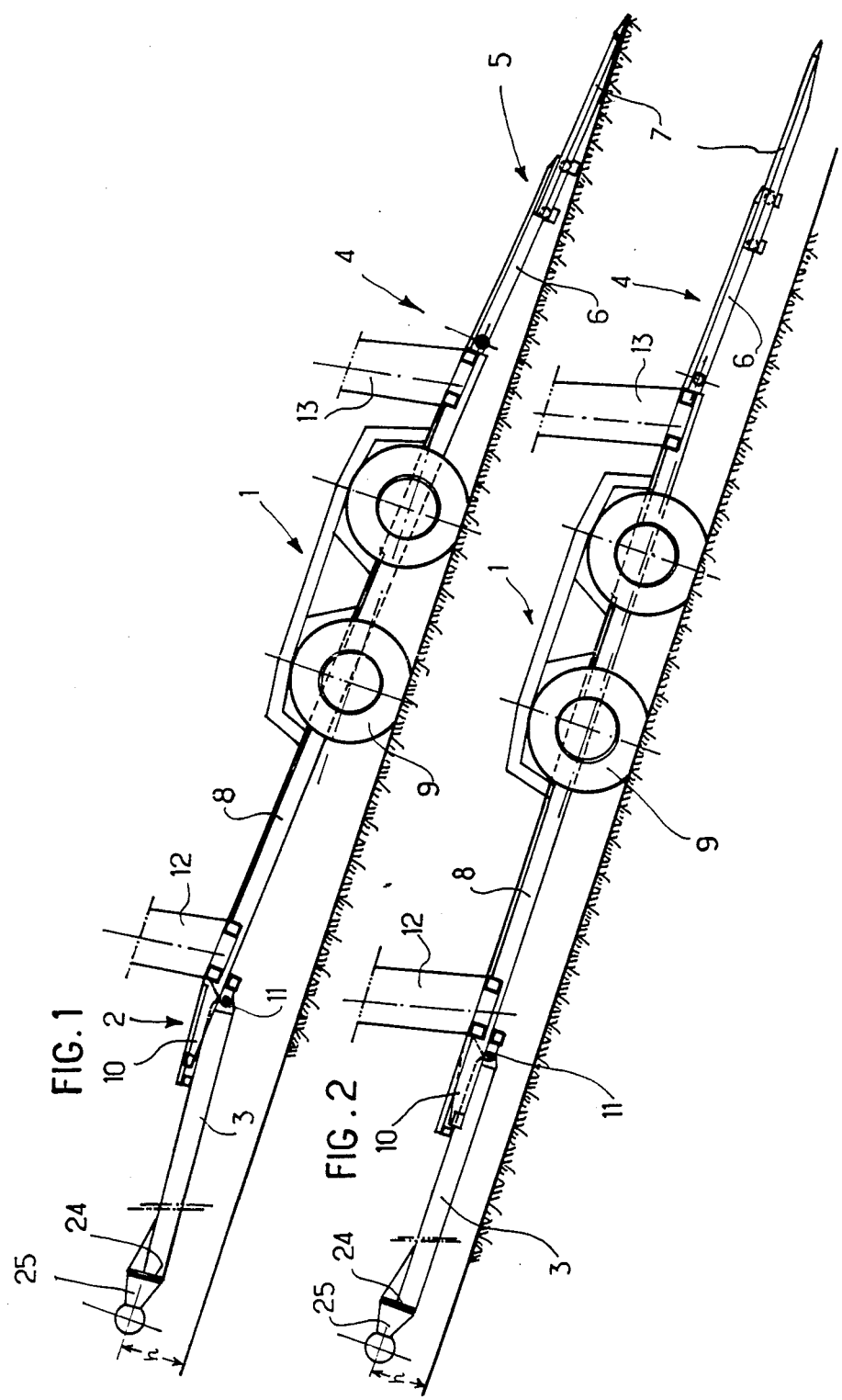

TILT TRAILER IN PARTICULAR FOR A ROAD TRANSPORT VEHICLE CARRIER

BACKGROUND OF THE INVENTION

The present invention relates to a tilt trailer and its control device in particular for road transport vehicle carriers.

The road transport vehicle carriers equipped with, or connected to a trailer are loaded from the rear end of the trailer. The first vehicles are loaded onto the upper decks and the others are loaded onto the bottom deck.

The vehicles can reach the trailer levels by means of removable ramps. These ramps, which are also necessary to unload the vehicles, are stowed away after use in a slide box under the frame.

The object of the present invention is to eliminate these ramps which are bulky and heavy accessories.

Moreover, handling these ramps for both loading and unloading takes a lot of time. It increases the immobilization time of the carrier for loading and unloading.

Furthermore, these ramps add to the weight of the trailer and increase the fuel consumption.

SUMMARY OF THE INVENTION

The aim of this invention is to do without these ramps by using directly the rear part of the trailer deck.

This invention is, therefore, to provide a tilt trailer and its control device especially for road transport vehicle carriers which have a drawbar articulated on the frame, allowing the frame of the trailer to swivel around a horizontal axis, even when it is loaded.

The tilt trailer has, according to the invention, the following advantages:
- the removable plates used to form the end of the access ramp become redundant;
- a noticeable gain of time during the loading and unloading phases;
- complete safety during haulage because of the self-locking device;
- the tilting up of the trailer permits to line up the track of the trailer with the rear track of the truck;
- the invention allows setting of the gradient of the trailer according to the relief of the ground
- the invention allows attainment of a small angle gradient
- the invention allows implementation of a continuous and flat access ramp.

BRIEF DESCRIPTION OF THE DRAWING

The technical features and other advantages of the invention will become apparent when considering the following description which serves as one among other instances carried out in the included drawings, i.e.:

FIG. 1 is a side elevational view of the trailer in the loading position;

FIG. 2 is a side elevational view of the trailer in the haulage position;

DESCRIPTION OF THE PREFERRED EMBODIMENT

Figure 3:
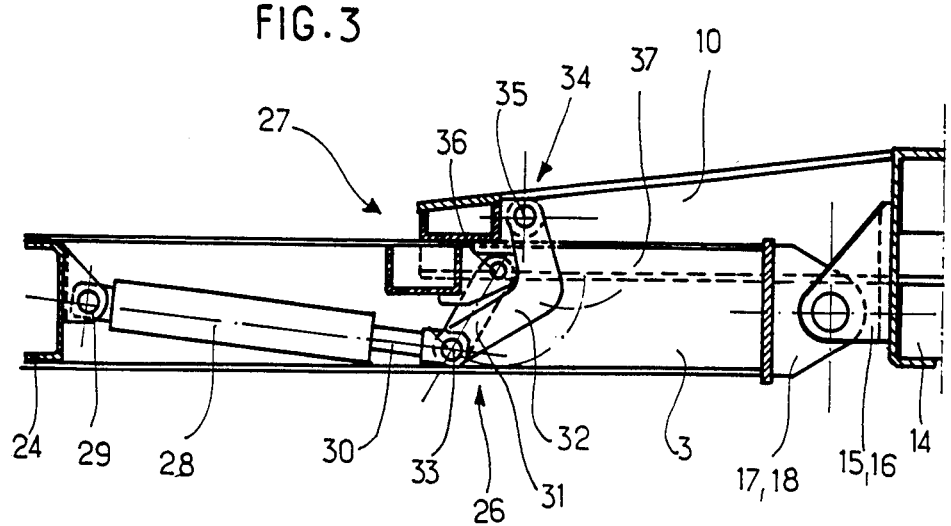
FIG. 3 is an enlarged lengthwise vertical sectional view of the trailer control tilting up device in the locked position.
Figure 4:
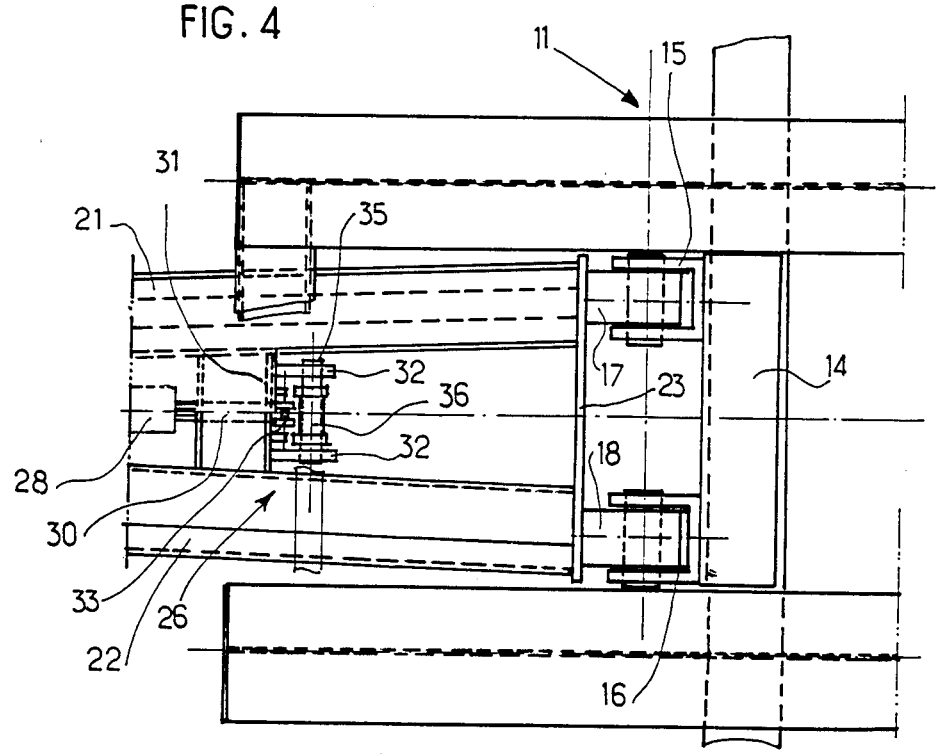
FIG. 4 is a top plan view of the articulated connection between the rear part of the drawbar and the front part of the trailer frame.
Figure 5:
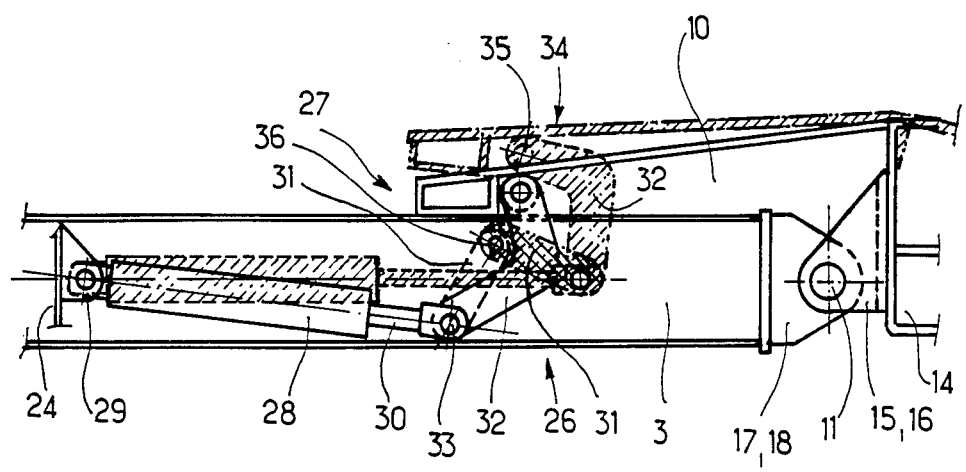
FIG. 5 is a diagrammatic, lengthwise, vertical sectional view, showing the two extreme positions of the self-locking control tilting device.

Referring now more particularly to the invention as shown in the drawings, the trailer (1) with central axles, without steering axle having a distortable actuated connection (2) with its drawbar (3), so as to allow the tilting down of the rear part of the said trailer, to realize with only the existing parts of the rear deck (4) an access ramp (5), without any complementary plates, previously required to provide the connection between the rear of the trailer and the ground.

The trailer rear deck (4) is composed of a rear load panel (6) provided with an extension (7), which is extended when loading, and retracted under the said rear load panel (6) when the unit moves.

The trailer frame (8) is located above the wheel axles (9) and has a front extension (10). The drawbar (3) is hinged around a horizontal axis (11) at the end of the frame.

In the represented implementation, the frame is fitted out with tilted posts (12) and (13), providing the connection with the upper deck.

The drawbar 3 is articulated on the first cross-beam (14) at the front of the frame by means of two fork ends (15) and (16) in which two pintles (17) and (18) are articulated by means of two lined up pivot spindles, in accordance with a horizontal axis (11).

The drawbar (3) is composed of two convergent sections (21) and (22) linked together by a rear plate (23) supporting the pintles (17) and (18) and by a front plate (24) constituting the trailer's saddle-mount.

The drawbar (3) and the frame extension (10) are connected by means of angle varying means, such as leverage means including a double distortable connection (2), for instance of a push-away type, which will be seen in greater detail hereafter with the adjoining aggregates, with particular reference to the FIGS. (3), (4) and (5).

Through its crosswise lying beam (25) situated at a front end of the trailer, and adapted to be connected to a rear-end of a (non-illustrated) carrier vehicle, the drawbar (3) bears the double connection (2) which may be, for example, of a double articulation push-away type (26), including an integrated self-locking device (27), of which a simple, hydraulic actuator allows to slightly widen the angle made by the frame plane and the drawbar from a first angle to a second angle. While this angle is opening, with the beam (25) being held above ground by its connection to a (non-illustrated) carrier vehicle, the rear panel (6) and the extension (7) go down and touch the ground (FIG. 1) to constitute a gently sloping vehicle access ramp, without the aid of any additional removable plate as has been implemented in the prior art.

In practice, that angle is enough to open it a few degrees for the rear of the trailer to reach the ground and allow the loading of the cars.

In greater detail, the double articulated push-away type connection (26) is implemented by a cylinder-piston unit, including a cylinder (28), articulated at one end (29) on the front plate (25), its other end (30) being the end of a piston rod hinged on the self-locking device (27), which is composed of two double-pivoting arms, an inside arm (31) and an outside arm (32), both hinged at their low ends through a common axle (33) to the piston rod end (30) of the cylinder (28).

The outer arm (32) is elbow-shaped and its upper end (34) is articulated to the frame extension (10) by means of an axle (35).

The inside arm (31) has its other end articulated by means of an axle (36) and fork ends (38), fitted on the crossbeam (37) of the drawbar (3).

When the cylinder (28) operates, the ends common to both arms (31) and (32) follow a portion of a circular trajectory around the upper axle (36) of the inside arm (31).

This movement produces the raising of the upper end (35) of the outside arm (32) and consequently the raising of the front extension (10) of the trailer frame from the drawbar (3) so that the leverage means is moved between a hauling state and a vehicle access state.

The widening of this angle allows the rear part of the trailer to reach the ground whatever the ground contour may be.

The elbow-shaped outside arm (32) constitutes a receptacle for the inside arm (31), which comes to rest on the outside arm (32) and thus provides a self-locking device in the haulage position.

The self-locking position is reached once the point of equilibrium has been surpassed by the outside arm (32) tilting against the inside arm (31) and with the three axles (33), (35) and (36) in a lined up position.

When the inside arm (31) is in this position, any movement in a vertical direction that could result in the opening of the angle between the plane of the frame and the drawbar (3), tends to push the inside arm (31) against the outside arm (32). This mechanism is therefore a safe and efficient locking device in the haulage position.

The general principle of this invention is the creation of a tilt-trailer operated by the raising of the front end of the frame. This function is carried out by a double-articulated hook in a draw-away clasp, operated by a jack or piston-cylinder unit between the front end of the frame and the drawbar, and by a drawbar that pivots around a horizontal axle at the end of the frame.

This connection pushes the drawbar away from the front end of the frame by means of two articulated structures moved by a jack or piston-cylinder unit.

Of course, the drawbar may be pushed away from the end of the frame by any other equivalent means.

The present invention has been described and illustrated in connection with preferred embodiments; it is to be understood that modifications and variations may be resorted to without departing from the spirit of the invention, as those skilled in the art will readily understand.

Such modifications and variations are considered to be within the purview and scope of the present invention as defined by the appended claims.

What is claimed as the invention is:

1. In a trailer adapted to be connected with a front end thereof to a rear-end of a carrier vehicle, said front end of the trailer being held in an operative position of said trailer at a predetermined height above ground, when said trailer is connected to the rear-end of said carrier vehicle, the trailer including a frame defining a trailer frame plane extending in a hauling position of the trailer substantially parallel to the ground, a front extension and a rear extension of said trailer frame extending substantially along said trailer frame plane, said front extension being connected between said front end and the trailer frame, said trailer front end including an elongated drawbar defining a drawbar plane subtending a first angle close to 180° with said trailer frame plane in said hauling position, the improvement comprising angle varying means for changing said first angle to a second angle when said trailer frame is in a position for providing access to vehicles to be loaded onto the trailer for subsequent passage to said carrier vehicle, said predetermined height being similar in said hauling and vehicle access positions of said trailer frame, whereby said rear extension touches the ground when said drawbar plane subtends said second angle with said trailer frame plane, so as to provide a gently sloping vehicle access ramp, wherein said angle varying means comprises a cylinder-piston unit, and articulated leverage means being connected near one end thereof to a piston rod of said cylinder-piston unit, having another end thereof articulatably connected to said trailer front extension, and having an intermediate hinge thereof connected to said drawbar, wherein said articulated leverage means is movable between a hauling state and a vehicle access state, and further comprises self-locking means for preventing movement of said leverage means out of said hauling state along at least one direction when said trailer frame is in said hauling position, and wherein said articulated leverage means comprises a first arm hingeably connected with one end thereof to an end of said piston rod, and hingeably connected with another end thereof to said drawbar, and an elbow-shaped arm hingeably connected with one end portion thereof to said other end of said first arm, the other end portion of said elbow-shaped arm constituting said other end of said leverage means.

* * * * *